United States Patent [19]

Nishioka

[11] Patent Number: 4,831,468

[45] Date of Patent: May 16, 1989

[54] INDEX SIGNAL GENERATION TIMING CONTROL SYSTEM

[75] Inventor: Syoji Nishioka, Fujinomiya, Japan

[73] Assignee: Kabushiki Kaisha Toshiba, Kawasaki, Japan

[21] Appl. No.: 101,258

[22] Filed: Sep. 24, 1987

[30] Foreign Application Priority Data

Sep. 30, 1986 [JP] Japan .................. 61-229879

[51] Int. Cl.⁴ .............................. G11B 15/18
[52] U.S. Cl. .................... 360/722; 324/208;
324/102; 324/174; 328/110; 307/358;
360/99.01
[58] Field of Search ............ 360/72.2, 72.1, 71,
360/73, 97–99, 74.1, 74.4, 74.5, 74.6, 75, 77,
73.3, 97.01, 98.01, 99.01, 77.02; 324/208, 102,
225, 174; 307/358; 328/110

[56] References Cited

U.S. PATENT DOCUMENTS

| | | | |
|---|---|---|---|
| 2,973,430 | 2/1961 | Pelino | 246/249 |
| 3,524,075 | 8/1970 | Matthews et al. | 307/235 |
| 3,801,830 | 4/1974 | Boyer | 307/235 R |
| 4,166,977 | 9/1979 | Glauert et al. | 324/173 |
| 4,431,916 | 2/1984 | Couch | 250/214 R |
| 4,535,289 | 8/1985 | Abe et al. | 324/208 |
| 4,609,869 | 9/1986 | Metcalf | 324/208 |
| 4,694,200 | 9/1987 | Hetyei | 307/358 |
| 4,769,597 | 9/1988 | Sano | 324/102 |

FOREIGN PATENT DOCUMENTS 59-615 1/1984 Japan .

Primary Examiner—John H. Wolff
Assistant Examiner—Matthew J. Bussan
Attorney, Agent, or Firm—Finnegan, Henderson, Farabow, Garrett & Dunner

[57] ABSTRACT

An index signal generation timing control system of this invention comprises a rotation signal generating section which generates a rotation signal representing the rotational state of a customer engineer (CE) disk set on a spindle. A burst signal generating section generates a burst signal from burst data written on the CE disk. A measuring section measures the time from time when an index signal becomes active to time when the burst signal is generated by the burst signal generating section. A calculation control section subtracts a predetermined time from the measured time and determines delay time data corresponding to the subtraction result. The determined delay time data is written in memory at the address that is generated in accordance with a write control signal from the calculation control section. When the rotation signal is generated by the rotation signal generating section, the index signal is generated by an index signal generating section with a delay based on the delay time data stored in the memory.

9 Claims, 3 Drawing Sheets

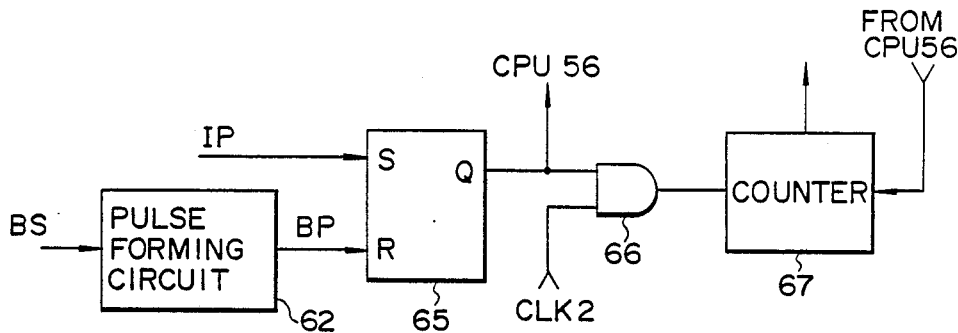
F I G. 2
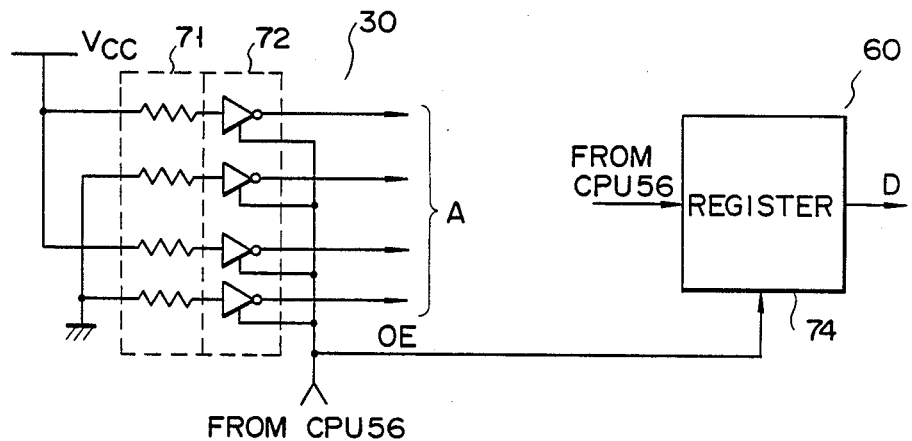
F I G. 3
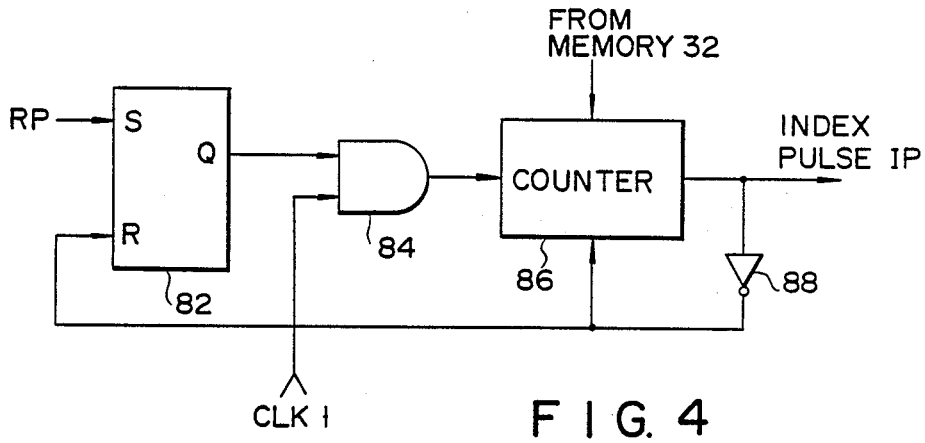
F I G. 4

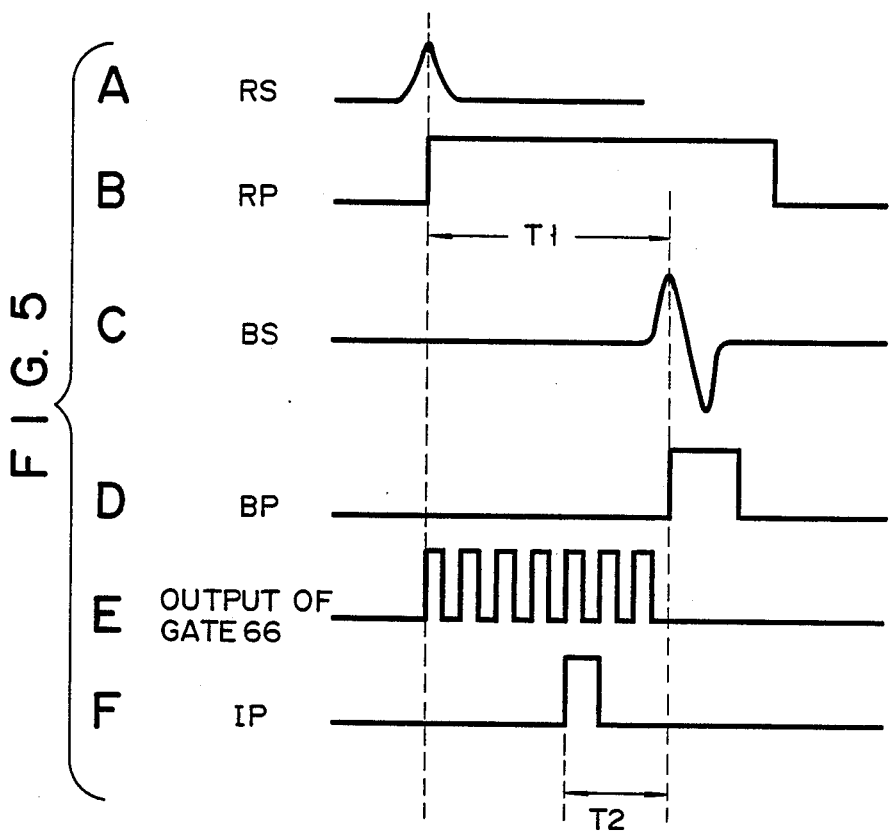

INDEX SIGNAL GENERATION TIMING CONTROL SYSTEM

BACKGROUND OF THE INVENTION

This invention relates to a system for automatically controlling the index signal generation timing of a floppy disk drive unit.

Conventional floppy disk drive (FDD) units have an index pulse detector which produces a single index pulse upon every rotation of a magnetic recording medium (hereinafter referred to as a disk). This index pulse permits a floppy disk controller (FDC) to detect the start and end of a track on the disk.

According to 5¼ inch FDD units, for instance, an index hole is provided in advance and when the hole is detected by the index pulse detector coupled to a photoelectric sensor, the index pulse is produced. No index hole is provided in a 3.5 inch disk and the disk and a spindle motor are chucked at a constant angle so that a spindle is provided with a signal generator, such as a magnet.

The rising of a delayed index pulse is adjusted in order to properly execute data read/write from the begining of a track for providing a compatibility between FDD units. In this case, a positional difference between the index pulse and delayed index pulse is called an index positional accuracy. Conventionally, to attain the proper index positional accuracy, the mounting position of a sensor is adjusted for a 5¼ inch FDD unit while the rising of the delayed index pulse is electrically delayed for a 3.5 inch FDD unit. These adjusting systems utilize a CE (customer engineer) disk and the delay time is controlled by varying a resistor and a capacitor of a timer unit.

In either system, it is difficult to provide automatic index adjustment and high adjusting accuracy, and there is a strong demand for a system that fulfills the need.

SUMMARY OF THE INVENTION

With the above situation in mind, it is an object of this invention to provide an index signal generation timing control system, which is equipped with a floppy disk drive unit and a control unit. This system comprises:

rotation signal generating section for generating a rotation signal representing a rotation state of a customer engineer disk set on a spindle;

burst signal generating section for generating a burst signal from burst data written on the customer engineer disk;

memory means for storing delay time data;

index signal generating section for generating an index signal after elapse of a time based on the delay time data stored in the memory, when the rotation signal is generated by the rotation signal generating section;

measuring section for measuring time from time when the index signal generated by the index signal generating section becomes active to time when the burst signal is generated by the burst signal generating section;

calculation control section for subtracting a predetermined time from the time measured by the measuring section to determine delay time data corresponding to a subtraction result;

address generating section for generating an address according to a write control signal from the calculation control section; and writing section for writing the determined delay time data in the memory at the address generated by the address generating section.

With the above arrangement, it is possible to provide automatic and highly accurate control of the index signal generation timing for compatibility of floppy disk drive units. This results in higher efficiency of the manufacturing process of floppy disk drive units and also in reduction of the manufacturing cost.

BRIEF DESCRIPTION OF THE DRAWINGS

FIG. 2 is a detailed block diagram illustrating the arrangement of a counter section 54 of the system shown in FIG. 1;

FIG. 3 is a detailed block diagram illustrating the arrangement of an address generator 30 and a write access circuit 60 of the system shown in FIG. 1;

FIG. 4 is a detailed block diagram illustrating the arrangement of an index pulse generator 26 of the system shown in FIG. 1; and FIGS. 5A to 5F are timing charts for explaining the operation of the embodiment.

DETAILED DESCRIPTION OF THE PREFERRED EMBODIMENT

Figure 1:
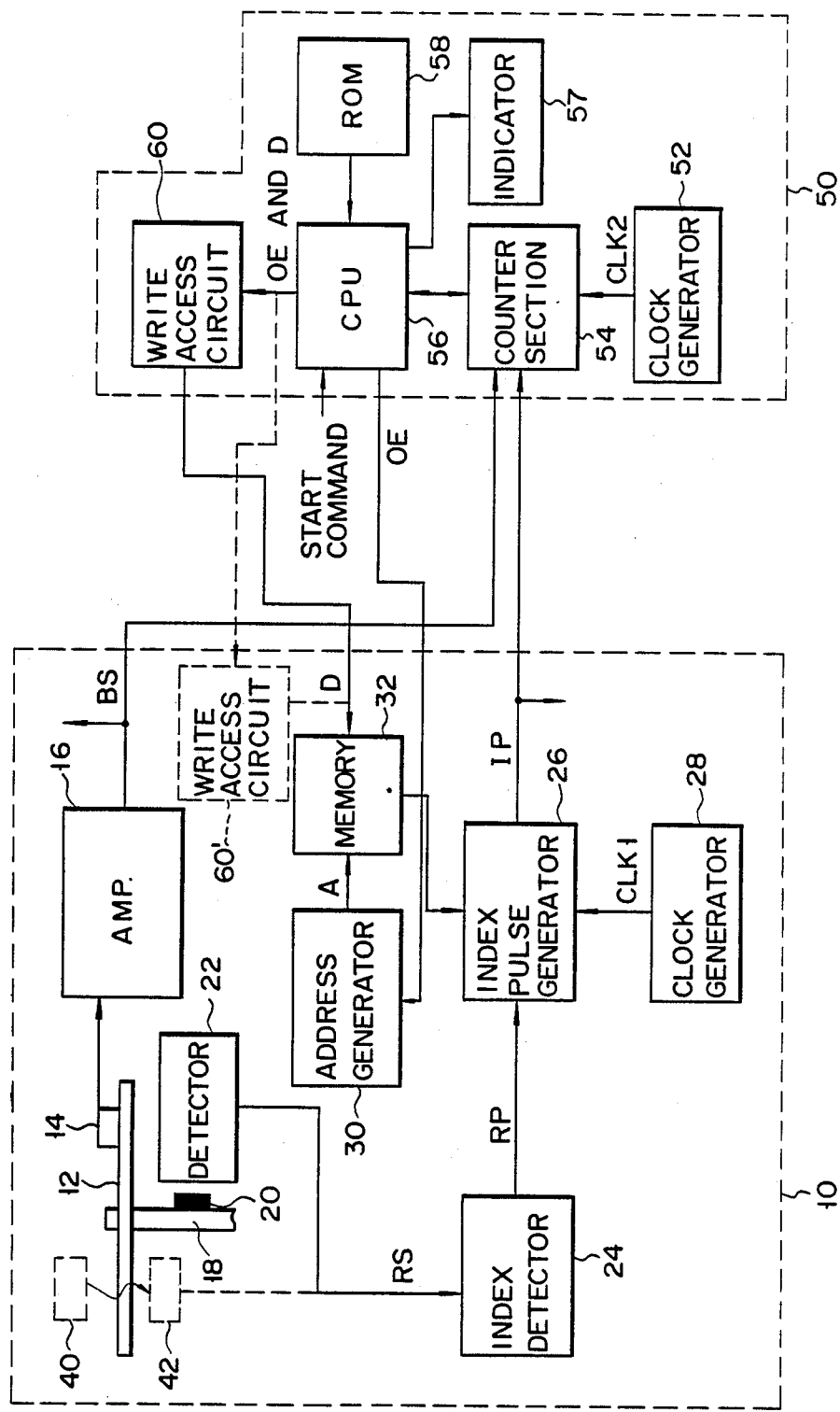
FIG. 1 is a block diagram illustrating the arrangement of an index signal generation timing control system according to an embodiment of this invention.

Referring to the accompanying drawings, an index signal generation timing control system according to an embodiment of this invention will now be explained.

To begin with, the arrangement of the embodiment will be explained below with reference to FIGS. 1 through 4. In FIG. 1, a magnet 20 is mounted on a spindle 18 which is set with a customer engineer (CE) disk 12. A detector 22, which may be constituted by a HALL element, detects the magnetic field generated by magnet 20 when spindle 18 is rotated by a motor (not shown) and produces a rotation signal RS. The rotation signal RS is supplied to an index detector 24 where signal RS is converted into a rotation pulse RP which rises at the peak of signal RS. This index detector 24 is well known by those skilled in the concerned field. Rotation pulse RP is supplied to an index pulse generator 26, which is also supplied with a clock CLK1 from a clock generator 28 and delay time data from a memory 32. The generator 26 produces an index pulse IP that is supplied to a counter section 54.

FIG. 4 illustrates a detailed arrangement of index pulse generator 26. Referring now to FIG. 4, rotation pulse RP is supplied to an S input terminal of an RS flip-flop 82, which is therefore set at the timing at which pulse RP is active. An AND gate 84 receives a Q output of flip-flop 82 and clock CLK1 from clock generator 28 and outputs a logical product of these inputs to a counter 86. This counter 86, which is preset with the delay time data stored in memory 32, is down-counted by the clock from AND gate 84 and outputs a borrow signal as index pulse IP when the count becomes "0". After being inverted by an inverter 88, index pulse IP is supplied to counter 86 and an R terminal of flip-flop 82. The rising of the inverted index pulse IP clears counter 86 and resets flip-flop 82 that in turn has the Q output of "0."

Burst data is read out by a magnetic head 14 from CE disk 12 set on spindle 18 and is then amplified by an amplifier 16 that produces a burst signal BS. This burst signal BS is supplied to counter section 54.

Memory 32 is of a non-volatile type and may be constituted by a ROM or P-ROM. Memory 32 is supplied with an address A and a high voltage from address generator 30 and delay time data D from a write access circuit 60, with this data D being written at address A. No data is written at address A of memory 32 at the time this floppy disk drive unit 10 is manufactured; in the adjustment phase, data is written there for the first time. In accordance with the input instruction, address generator 30 produces address A which permits delay time data D written in memory 32 to be read out therefrom to index pulse generator 26.

The above-described magnetic head 14, amplifier 16, spindle 18, magnet 20, detector 22, index detector 24, index pulse generator 26, clock generator 28, address generator 30 and memory 32 constitute a floppy disk drive unit 10. The arrangement of a control unit 50 will now be explained.

Counter section 54 receives burst signal BS from amplifier 16 and index pulse IP from index pulse generator 26. As shown in FIG. 2 that illustrates a detailed arrangement of counter section 54, the burst signal BS input to counter section 54 is converted by a pulse forming circuit 62 into a burst pulse BP that rises at the peak of signal BS. This circuit 62 is well known by those skilled in this field.

By a clock CLK2 from clock generator 52, a counter 67 measures the time span from a point of time when index pulse IP becomes active to a point of time when burst pulse BP becomes active.

Referring now to FIG. 2, an RS flip-flop 65 has an S terminal supplied with index pulse IP from index pulse generator 26, so that the flip-flop 65 is set by the pulse IP. Flip-flop 65 also has an R terminal supplied with burst pulse BP from pulse forming circuit 62. A Q output of flip-flop 65 is supplied to a CPU 56 where it is used to detect the beginning and end of the time measuring operation. The Q output is also supplied to one input terminal of an AND gate 66 which has the other input terminal supplied with clock CLK2 from clock generator 52. The output of AND gate 66 is supplied to a counter 67 and is counted there. The counting result is read out by CPU 56 and a signal produced from CPU 56 thereafter resets counter 67.

Upon reception of a start command, CPU 56 starts executing the process to determine the timing for index pulse generation according to the program written in ROM 58. When a count value from counter section 54 is input to CPU 56, the CPU subtracts a time T2 (which will be described later) from the count value and determines the result as the delay time data. When the delay time data is determined, CPU 56 stores the delay time data in write access circuit 60. Thereafter, CPU 56 sends a write control signal OE to address generator 30 and write access circuit 60 so that the delay time data is written in memory 32.

Write access circuit 60 and address generator 30 are illustrated in detail in FIG. 3. Referring now to FIG. 3, individual resistors in a resistor group 71 each have one end either coupled to a source voltage or grounded according to the write address of memory 32. These resistors have the other end coupled to a driver group 72. Individual 3-state drivers of driver group 72 are controlled by write control signal OE from CPU 56.

When control signal OE is input to the drivers, the address A is supplied to memory 32. A register 74 stores the delay time data and sends this data to memory 32 at the same time as the address A in accordance with control signal OE is supplied to driver group 72. At this time, a high voltage (not shown) is also supplied to memory 32.

Thereafter, the aforementioned operation is repeated to check whether or not the generation timing of the index pulse is properly adjusted. When the delay time data is properly written in memory 32, CPU 56 drives an indicator 57.

The operation of this embodiment will now be explained with reference to FIGS. 5A through 5F.

With floppy disk unit 10 powered on and CE disk 12 set on spindle 18 and rotating in the unit, when a control start command is input to CPU 56, CPU 56 receives a delay time measured by counter section 54.

Magnet 20 rotates with spindle 18, and detector 22 detects rotation signal RS as shown in FIG. 5A. The detected signal RS is converted by index detector 24 into rotation pulse RP as shown in FIG. 5B which is supplied to index pulse generator 26. Index pulse generator 26 is supplied in advance with the delay time data that is stored in memory 32 at the address generated from address generator 30. However, since no data is written at this address at that time, the delay time data is "0." Consequently, counter 86 sends index pulse IP to counter section 54 without a delay.

The index pulse IP input to counter section 54 is supplied to the S terminal of RS flip-flop 65. As a result, the Q output of flip-flop 65 becomes "1" and clock CLK2 from clock generator 52 is supplied through AND gate 66 to counter 67 (see FIG. 5E) and is counted there.

When CE disk 12 is rotated, burst signal BS (FIG. 5C) is read out by head 14. The signal BS is amplified by amplifier 16 and is then supplied to pulse forming circuit 62 for burst pulse BP (FIG. 5D) to be formed that is output to flip-flop 65. The flip-flop 65 is reset by burst pulse BP and has the Q output of "0." Consequently, the supply of clock CK2 to counter 67 is stopped and the counting is stopped as a consequence. When CPU 56 which is monitoring the output of flip-flop 65 detects the Q output of the flip-flop 65 to be "0," it reads out a count value T1 from counter 67 and then resets the counter 67.

Upon reception of count value T1, CPU 56 calculates (T1 - T2) and determines the delay time data based on a frequency of clock CLK1. A time T2 is a predetermined value, (T1 - T2) becomes the time to be delayed or the delay time data. When the delay time data is attained, CPU 56 stores the delay time data in write access circuit 60 and then generates write control signal OE to cause address generator 30 and write access circuit 60 to write the delay time data in memory 32.

When writing the delay time data is completed, floppy disk drive unit 10 is reset and the delay time data read out from memory 30 at the address generated from address generator 30 is preset in counter 86 of index pulse generator 28. Then, in the manner explained above, rotation pulse RP is output from index detector 24 and is supplied to index pulse generator 26. The rotation pulse RP is supplied to the S terminal of RS flip-flop 82, thereby setting the flip-flop 82. The Q output of flip-flop 82 is supplied to one input terminal of AND gate 84. The other input terminal of AND gate 84 is supplied with clock CLK1 from clock generator 28, and the output of this gate 84 is sent to counter 86. With the delay time data from memory 32 used as the preset value, the counter 86 executes a down-count operation upon reception of each clock CLK1 through AND gate 84. When the count becomes "0," counter 86 outputs the borrow pulse as index pulse IP, which is sent to counter section 54. Counter 86 and flip-flop 82 are reset by the inverted pulse $\overline{\text{IP}}$ that is provided by inverter 88.

RS flip-flop 65 is set by index pulse IP from index pulse generator 26 and measures time T2 in the above-described manner. When the time measurement is completed, CPU 56 determines whether or not the measured value is within a predetermined error allowance range. If the decision is affirmative, CPU 56 causes indicator 57 to indicate the end of the timing control process.

Write access circuit 60 has been explained to be a part of control unit 50, but it may be provided in floppy disk drive unit 10, as write access circuit 60'.

The embodiment explained above employs a magnet (magnet 20) and a HALL element (detector 22); however, they may be replaced with a light emitting unit and a light receiving unit. When an index hole is provided in a floppy disk, for example, of a 5 inch size, a light emitting element 40 and a light receiving element 42 (both indicated by the broken lines in FIG. 1) may be provided where illustrated in FIG. 1.

What is claimed is:

1. An index signal generation timing control system having a floppy disk drive unit and a control unit, said system comprising:
   rotation signal generating means for generating a rotation signal representing a rotation state of a customer engineer disk that is set on a spindle;
   burst signal generating means for generating a burst signal from burst data written on said customer engineer disk;
   memory means for storing delay time data;
   index signal generating means for generating an index signal after elapse of a time based on said delay time data stored in said memory means, when said rotation signal is generated by said rotation signal generating means;
   measuring means for measuring time from a time when said index signal generated by said index signal generating means becomes active to a time when said burst signal generated by said burst signal generating means reaches its peak;
   calculation control means for subtracting a predetermined time from said time measured by said measuring means to determine delay time data corresponding to a subtraction result;
   address generating means for generating an address according to a write control signal from said calculation control means; and
   writing means for writing said determined delay time data in said memory means at said address generated by said address generating means, in accordance with the write control signal.

2. The system according to claim 1, wherein said rotation signal generating means, said burst signal generating means, said memory means, said address generating means and said index signal generating means are included in said floppy disk drive unit, and said measuring means, said calculation control means and said writing means are included in said control unit.

3. The system according to claim 1, wherein said rotation signal generating means, said burst signal generating means, said memory means, said address generating means, said index signal generating means and said writing means are included in said floppy disk drive unit, and said measuring means and said calculation control means are included in said control unit.

4. The system according to claim 1, wherein said memory means comprises a non-volatile and writable memory.

5. The system according to claim 1, wherein said rotation signal generating means includes a magnet mounted on said spindle and a HALL element for detecting a magnetic field generated from said magnet.

6. The system according to claim 1, wherein said rotation signal generating means includes light emitting means mounted on said spindle and light receiving means for detecting light from said light emitting means.

7. The system according to claim 1, wherein said rotation signal generating means includes light emitting means provided above and separated from said customer engineer disk, and light receiving means, provided opposite to said light emitting means with respect to said customer engineer disk, for detecting light coming from said light emitting means through an index hole of said customer engineer disk.

8. The system according to claim 1, wherein said calculation control means comprises means for determining whether or not a time from said index signal to the peak of said burst signal is within a predetermined error allowance range.

9. The system according to claim 8, further comprising indicator means for indicating the end of a timing control operation when said time from said index signal to the peak of said burst signal is within said predetermined error allowance range.

* * * * *